United States Patent [19]

Nikadio et al.

[11] Patent Number: 4,835,548

[45] Date of Patent: May 30, 1989

[54] THERMAL HEAD

[75] Inventors: Masaru Nikadio, Miura; Yoshiaki Ouchi, Yokohama; Tadayoshi Kinoshita, Tokyo; Reiko Watanabe, Yokohama; Shinzo Sugai, Chigasaki, all of Japan

[73] Assignee: Kabushiki Kaisha Toshiba, Kawasaki, Japan

[21] Appl. No.: 63,214

[22] Filed: Jun. 17, 1987

[30] Foreign Application Priority Data

Jun. 25, 1986 [JP] Japan ................................ 61-147145
Aug. 27, 1986 [JP] Japan ................................ 61-198914

[51] Int. Cl.⁴ ............................................ G01D 15/10
[52] U.S. Cl. ............................... 346/76 PH; 219/216; 200/120
[58] Field of Search .......................... 346/76 PH–76 R, 346/1.1; 219/216, 216 PH, 538, 539, 542, 543, 553; 400/120, 120 PH

[56] References Cited

U.S. PATENT DOCUMENTS

| | | | |
|---|---|---|---|
| 4,640,723 | 2/1987 | Sugai et al. | 148/411 |
| 4,679,056 | 7/1987 | Kobayashi et al. | 346/76 PH |
| 4,680,593 | 7/1987 | Takeno et al. | 346/76 PH |

FOREIGN PATENT DOCUMENTS

| | | |
|---|---|---|
| 0177193 | 9/1986 | European Pat. Off. . |
| 3447581 | 11/1985 | Fed. Rep. of Germany . |
| 3435407 | 3/1986 | Fed. Rep. of Germany . |
| 49105133 | 12/1947 | Japan . |
| 0058372 | 1/1980 | Japan . |
| 57-46895 | 3/1982 | Japan . |
| 59-140076 | 8/1984 | Japan . |
| 60-206678 | 10/1985 | Japan . |
| 60-55316 | 12/1985 | Japan . |
| 61167574 | 7/1986 | Japan . |

*Primary Examiner*—E. A. Goldberg
*Assistant Examiner*—Huan H. Tran
*Attorney, Agent, or Firm*—Cushman, Darby & Cushman

[57] ABSTRACT

In a thermal head, an electrical and heat insulating layer of glass is formed on a substrate made of ferrie Fe-Cr stainless steel. Fe-Cr stainless steel contains 16 to 18% chromium by weight. Heating resistors having a specific patterns are formed on the electrical and heat insulating layer and electrically connected to the substrate acting as a common electrode. Lead wires of an Aλ-Si-Cu alloy, as individual electrodes, are formed on the layer and the heating resistors. The heating resistors and the lead wires are covered by a protective layer.

7 Claims, 2 Drawing Sheets

THERMAL HEAD

BACKGROUND OF THE INVENTION

The present invention relates to a thermal head, and more particularly, to a substrate structure of a thermal head.

Thermal heads are conventionally used in recording devices such as facsimiles, printers, and word processors. In general, the thermal heads are fabricated as follows. First, a heat insulating glaze layer, composed mainly of silicon oxide, barium oxide, calcium oxide, and boron oxide, is formed on a high electrical resistance substrate, made of aluminum oxide, as an alkali-free ceramic material of at least 90% purity. Then, heating resistors, made of Ta-$SiO_2$, $Ta_2N$, NiCr, etc., are formed in a specific pattern on the heat insulating layer. Further, conductor patterns of aluminum or gold, for use as individual electrodes and a common electrode, are formed on the heating resistors. Also, the resistors are formed at least with an oxidation protective layer made of $SiO_2$, and a abrasion protective layer made of $Ta_2O_5$. The oxidation protective layer serves to prevent oxidation of the heating resistors, while the abrasion protective layer prevents the head from being worn away by contact with thermal paper.

As is generally known, when a pulsating voltage is applied between the individual electrodes and the common electrode, a current is supplied to the heating resistors between the electrodes. As a result, the resistors generate Joule heat, whereby the heat-sensitive paper pressed onto the abrasion protective layer is printed. The generated Joule heat diffuses not only to the paper side, but also to the substrate side. The heat insulating layer serves to control the conduction and accumulation of the heat. Thus, the heat applied to the heat-sensitive paper can be controlled properly for satisfactory printing.

The high electrical resistance substrates of the thermal heads, as described above, are made of ceramic material, and most of them are formed of aluminum oxide with a purity of 90% or more. Steps of manufacturing one such substrate include processes of material treatment, such as removal of alkaline-metal ions, a high-temperature sintering process, and finishing processes, including a polishing process. Thus, the manufacture of the substrate requires complicated processes, and therefore entails high costs.

The ceramic material contains alkaline-metal ions. If the thermal heads are made of this material, the alkaline-metal ions may possibly precipitate in the heating resistors, threby deteriorating the characteristics of the heating resistors. In order to prevent the alkaline-metal ion separation, the alkaline-metal ions must be previously removed from the material or ceramic powder, to be reduced to a content level below a reference value, e.g., 0.05% or less, by weight, for $Na_2O$.

The prior art substrate is obtained by compressing ceramic powder into a predetermined shape, and the sintering the resulting green sheet at a temperature of about 2,000° C. to 2,300° C. Immediately after the sintering, the substrate is subject to bending and/or warping. If it is formed directly into a thermal head, therefore, the head will not be able to have uniform intimate contact with the heat-sensitive paper. Accordingly, the surface of the ceramic substrate is polished in the polishing process to remove its bending and/or warping.

Moreover, the conventional thermal heads of the aforementioned construction can be miniaturized only to a certain extent. Thus, there is a demand for the development of thermal heads of a smaller size and simpler construction.

SUMMARY OF THE INVENTION

The object of the present invention is to provide a thermal head which can be manufactured at a low cost, using simple processes, and which exhibits a satisfactory printing capability.

According to the present invention, there is provided a thermal head which comprises a substrate structure, a heating resistor formed on the substrate structure, and an electric conductor formed on the substrate structure and connected electrically to the heating resistor, the substrate structure including an alloy, composed mainly of iron and chromium, and a high electrical resistance and heat insulating layer formed on the alloy.

According to the invention, moreover, there is provided a thermal head which comprises a substrate structure, a heating resistor formed on the substrate structure, and an electric conductor formed on the substrate structure and connected electrically to the heating resistor, the substrate structure being an iron alloy containing approximately 5% to 30% chromium by weight and at least one element at a content of approximately 0.05% to 5% by weight, the element being selected among a group of elements including aluminum, silicon, scandium, titanium, vanadium, yttrium, zirconium, niobium, lanthanum, and hafnium.

DETAILED DESCRIPTION OF THE PREFERRED EMBODIMENTS

Figure 1:
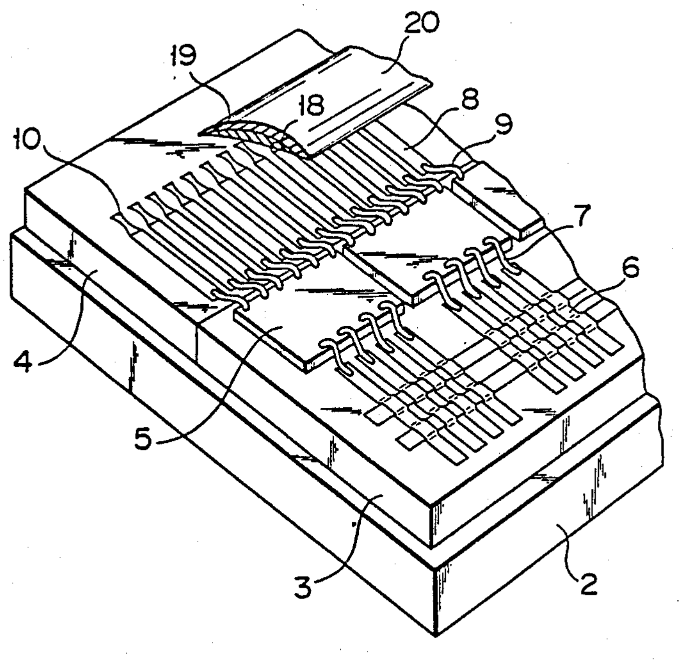
FIG. 1 is a cutaway perspective view of a thermal head according to an embodiment of the present invention.

In a thermal head according to an embodiment of the present invention, as shown in FIG. 1, driver-substrate structure 3 and resistor-substrate structure 4 are fixed on aluminum radiation substrate 2 by means of a bonding agent. Structure 3 carries thereon IC units 5 which are used to drive the thermal head. Also, lead patterns 6 of an Al-Si-Cu alloy are formed on structure 3. They are connected electrically to IC units 5 by means of bonding wires 7 so that signal currents are supplied to IC units 5 through patterns 6 and wires 7.

Resistor-substrate structure 4 carries thereon individual lead wires 8 of an Al-Si-Cu alloy, for use as individual electrodes, and heating resistors 10, which are formed in specific patterns. Each lead wire 8, as an individual electrode, has one end connected to each corresponding resistor 10, and the other end connected electrically to IC 5 by means of each corresponding bonding wire 9. Heating resistors 10 are connected electrically to structure 4 for use as a common electrode. Protective layer 20 is formed over structure 4, wires 8, and resistors 10.

Figure 2:
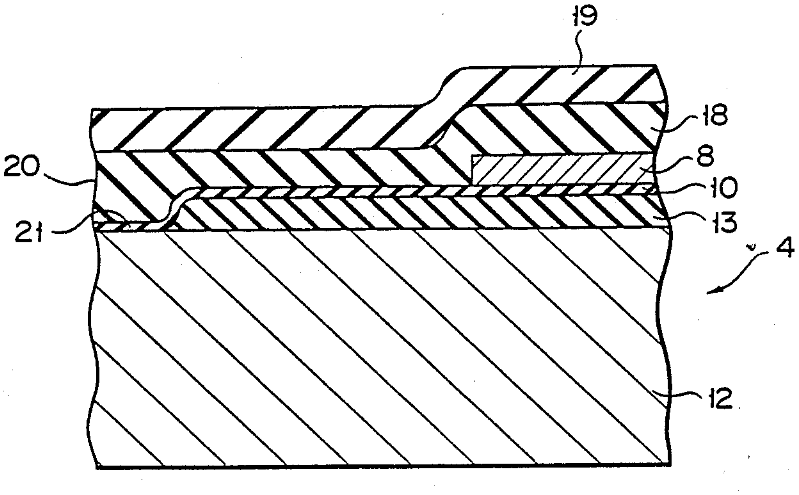
FIG. 2 is a sectional view schematically showing a substrate structure shown in FIG. 1.

In resistor-substrate structure 4 shown in FIG. 2, 30-$\mu$m-thick high electrical resistance and heat insulating layer 13 of heat-resistant resin, such as polyimide, is formed on 0.1-mm-thick substrate 12, made of an electrically conductive, ferritic iron chromium alloy, i.e., ferrice Fe-Cr stainless steel. This structure is used in place of a conventional single high electrical resistance substrate. Preferred Fe-Cr ferritic stainless steels include SUS-430 (JIS), i.e., Fe-Cr stainless steel containing 16 to 18% chromium by weight, and Fe-Cr-Ti-Al-Si stainless steel (i.e., JIS SUS430 with Ti, Al and Si added) containing 16% to 18% chromium, 0.4% titanium, 0.2% aluminum, and 0.2% silicon, all by weight. However, as the surface of the alloy substrate is oxidized during its manufacture, a satisfactory adhesive force can not take place between the alloy substrate 12 and the high resistance polyimide layer 13 and to improve the adhesion betwen the alloy substrate 12 and the high-resistance polyimide layer 13, the surface of the alloy substrate must first be reduced in a hydrogen atmosphere.

After the surface of the metal substrate has been reduced, a pre-polymer solution of polyamic acid is coated on the surface of the alloy substrate 12 by screen-printing followed by heating, and upon dehydration, the pre-polymer solution of polyamic acid forms a polyimide. In order to improve its adhesion to high-resistance layer 13 of high electrical resistant resin, the surface of Fe-Cr alloy substrate 12 may be roughed by honing or the like, before the reduction process in a hydrogen atmosphere, but not to such a degree that the surface condition of substrate 12 is damaged to render a sufficiently strong bonding between substrate 12 and layer 13 impossible. After through holes 21 are bored through high electrical resistance layer 13, the surface of layer 13 is spatter-etched in an Ar atmosphere containing 5% of oxygen by volume. Thereafter, heating resistor layer 10 such as Ta-$SiO_2$, $Ta_2N$, NiCr, etc., is formed on the treated surface of layer 13 by sputtering. Layer 10 is electrically in contact with substrate 12 through holes 21. Corresponding to the individual heating resistor strips, moreover, individual electrodes 8 are formed on resistor layer 10 and high electrical resistance layer 13. Oxidation protective layer 18, made of $SiO_2$, is formed on layers 13 and 10 and electrodes 8. Abrasion protective layer 19, made of $Ta_2O_5$, is formed on film 18. Thus, the thermal head is completed.

If the layer of polyimide or some other heat-resistant resin is formed, as an electric and heat insulating layer, on the surface of metal substrate 12, the resin or polyimide cures on the substrate at a temperature as low as about 400° to 500° C., for an uncyclized type, and at a temperature of about 200° to 300° C. for a cyclized type. Also, polyimide provides a substantial heat-insulating effect, and permits formation of a relatively thin film.

The layer of polyimide or other heat-resistant resin, for use as the electric and heat insulating layer, may be replaced with a glaze layer, which has conventionally been used as a heat insulating layer. When a glaze layer conventionally used as a thermal insulating layer, having a sintering temperature of 1,000° to 1,300° C., is used without modification, the substrate becomes warped when the glaze glass is sintered. If the substrate of the present invention is glazed with a protective glaze layer, therefore, the glaze layer used preferably should have the lowest possible sintering temperature, within an allowable range for heat resistance. For example, glass containing lead borosilicate or zinc borosilicate is preferably used for the glaze layer. A thermal head according to another embodiment of the present invention, using a glaze layer as a heat and electric insulation, will now be described.

Figure 3:
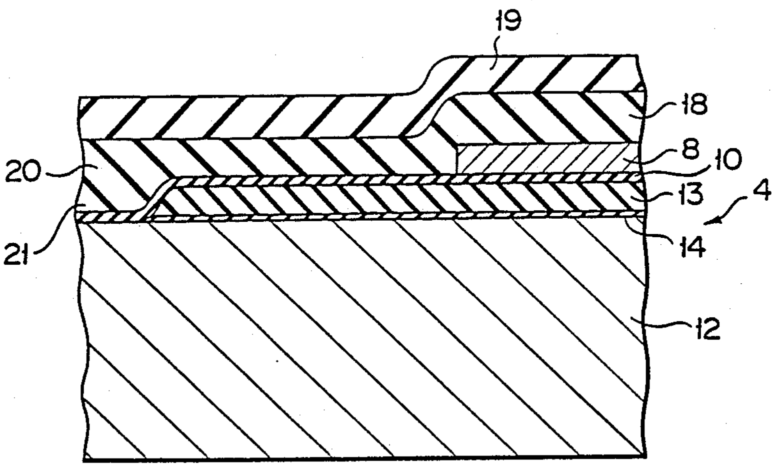
FIG. 3 is a sectional view schematically showing a substrate structure of a thermal head according to another embodiment of the invention.

In the thermal head of this embodiment, as shown in FIG. 3, resistor-substrate structure 4 is obtained by forming high electrical resistance layer 13 of 50-$\mu$m thickness on substrate 12 of 0.75-mm thickness. Layer 13 is a glass layer which contains 16% PbO, 56% SiO, 9% $Al_2O_3$, 4% $B_2O_3$, and 8% CaO, all by weight, and additional compounds including BaO, $Cr_2O_3$, and NiO. Substrate 12 is an alloy substrate which is composed of an Fe-Cr alloy and an additive element or elements, including aluminum, silicon, scandium, titanium, vanadium, yttrium, zirconium, niobium, lanthanum, and/or hafnium, especially aluminum, titanium, zirconium, and hafnium. For example, the substrate may be formed of Fe-Cr-Al-Ti stainless steel of which chromium, titanium and aluminum contents are 18%, 0.2%, and 4%, by weight, respectively. In order to improve the adhesion between the surface of alloy substrate 12 and high electrical resistance glaze layer 13, oxide layer 14 composed of the same constituents of substrate 12, e.g., tight oxide layer 14 of $Al_2O_3$ and $AlTi_2O_3$, is formed on the interface between the substrate surface and layer 13. Oxide layer 12 thus formed indeed increases the adhesion between alloy substrate 12 and glaze layer 13. This is because the oxide in the surface region of substrate 12 melts into the glass as it contact hot glaze glass layer 13 being formed, while the glaze glass melts into the oxide, whereby an intermediate glass-oxide layer is formed. Aluminum, silicon, titanium, vanadium, zirconium, and the like can easily be distributed into both a glass layer and an alloy substrate. When the surface region of substate 12 made of a Fe-Cr alloy is oxidized at 1150° to 1250° C. for 30 to 60 minutes in a wet hydrogen atmosphere having a dew point of 25° to 30° C., an oxide layer is formed, which contains oxides, such as $Al_2O_3$, $SiO_2$ and TiO, all able to readily melt into glass to achieve a strong adhesion between substrate 12 and layer 13. According to most of results of various experiments, the bonding between a glass layer and a metal substrate can be enhanced by forming a spinel-type oxide layer on the substrate, thereby producing a reaction layer between the oxide layer and the glass layer. Instead of forming an oxide layer, the surface of alloy substrate 12 can be roughed by a mechanical means such as honing. If this is the case, the surface of substrate 12 should not be roughed to so great a degree as to make a uniform contact between the head and a sheet of heat-sensitive paper impossible. Heating resistor layer 10 and individual electrodes 8 are formed on the substrate structure, in the same manner as aforesaid. Then, oxidation inhibitor layer 18 and abrasion protective layer 19 are formed over layer 10 and electrodes 8. Thus, the thermal head is completed.

In the thermal head according to the present invention, as described above, no ceramic substrate is used in substrate structure 4. Accordingly, the processes for manufacturing the thermal head do not include a process for removing alkaline-metal ions from the ceramic material. Also, there is not need of a process for removing bending and/or warping which may otherwise be caused while the ceramic substrate is being sintered. Thus, the manufacturing processes for the thermal head of the invention are simpler, and cost less than the prior art manufacturing processes.

Figure 4:
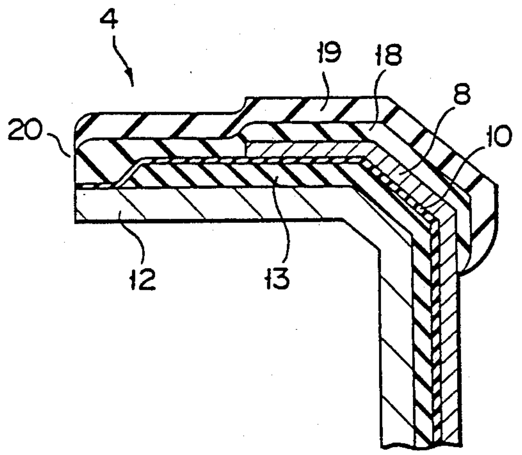
FIG. 4 is a sectional view of the substrate structure of FIG. 2 in a bent state.
Figure 5:
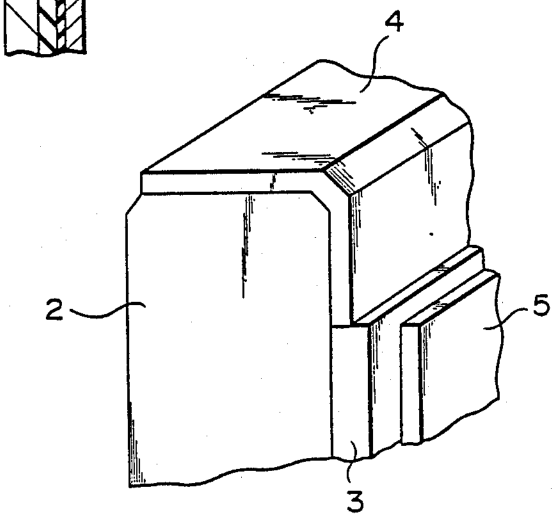
FIG. 5 is a cutaway perspective view of a thermal head incorporating the substrate structure shown in FIG. 4.

Morover, the substrate structure of the thermal head, according to the present invention, includes a substrate of a good electric conductor, such as an Fe-Cr or Fe-Cr-Al-Ti alloy, so that the alloy substrate itself can serve as a common electrode. Thus, the thermal head can be small-sized and simple in construction. Made of metal, furthermore, substrate structure 4 can be bent, which has as shown in FIG. 2, a thermal insulating layer made of polyamide resin or the like. After the substrate structure is completed, as shown in FIG. 2, it is bent into an L, as shown in FIG. 4. Then, the structure is fitted on the corner of heat-radiation substrate 12, as shown in FIG. 5. Thus, the thermal head of a vertical type is assembled. In FIGS. 1 to 5, like reference numerals refer to like portions throughout the drawings.

The inventors hereof selected the Fe-Cr alloy as the material of the substrate of the high-resistance substrate structure for the following reasons.

First, the Fe-Cr ferritic stainless steel has a coefficient of thermal expansions of about $10\times10^{-6}$ K$^{-1}$, as compared with about $7\times10^{-6}$ K$^{-1}$ for the conventional substrate material or $Al_2O_3$. These two figures are approximate to each other. Accordingly, the same materials of the heating resistors, oxidation protective film, and abrasion protective film for the the prior art thermal heads can be used directly for the thermal head of the invention.

Secondly, the Fe-Cr stainless steel of this type has a thermal conductivity of about 25 W/m. k, which is approximate to about 20 W/m. k for the conventional substrate material or $Al_2O_3$. Also in this respect, the materials for the prior art thermal heads can be utilized for the thermal head of the invention.

Thirdly, substrates of thermal heads, in general, are heated continuously to 200° to 300° C., and instantaneously to a high temperature of 400° to 500° C. Naturally, they must stand such severe temperature conditions, both thermally and mechanically. The Fe-Cr ferritic stainless steel can meet this requirement.

Fourthly, the substrates are attached by various dry etching gases and chemical etching solutions, during the manufacture of the thermal heads, so that they must be resistant to corrosion. This requirement can be satisfied by an Fe-Cr alloy, especially by one having a chromium content of about 5 to 30% by weight, preferably about 8 to 20%.

Fifthly, stainless steel, like other metal materials for substrates, can be straightened if it becomes warped.

Fe-Cr-Ni austenitic stainless steel may possibly be used as an alloy having the aforementioned characteristics. However, its coefficient of thermal expansion is about $17\times10^{-6}$ K$^{-1}$, and it is too high. Nevertheless, there will be no problem as long as the content ratio of the third element(s) added to the Fe-Cr alloy is within a range such that the body-centered cubic structure (bcc structure) of the ferritic stainless steel cannot be changed into the face-centered cubic structure (fcc structure) of the austenitic stainless steel.

The following are the reasons why the inventors hereof used the alloy composed of an Fe-Cr alloy and at least one additive element selected among a group of elements including aluminum, silicon, scandium, titanium, vanadium, yttrium, zirconium, niobium, lanthanum, and hafnium, instead of using a mere Fe-Cr alloy.

First, when using a metal substrate for the thermal head, a high electrical resistance, heat insulating layer must be formed over the structure of the substrate. If the material of the substrate is a mere Fe-Cr alloy, the contact between the substrate and the glaze glass layer often cannot be fully intimate. If any of the aforesaid elements is added to the Fe-Cr alloy, thereby forming an oxide layer, especially a spinel-type oxide layer composed of the oxide of the same constituent elements of the metal substrate, on the surface of the substrate, then the adhesion is improved considerably.

Secondly, the metal substrate for the thermal head must be resistant to corrosion because it should be attached by various corrosive gases for dry etching, as well as chemical etching solutions, during the manufacture of the thermal head, and may also be used actually at high temperature and humidity. The corrosion resistance of the metal substrate can be improved by adding aluminum, silicon, scandium, titanium, vanadium, yttrium, zirconium, niobium, lanthanum, and/or hafnium, especially aluminum, titanium, zirconium, and hafnium, to the Fe-Cr alloy.

Thirdly, the Fe-Cr alloy was selected as the material for the metal substrate for the following reasons. Namely, it is Fe-Cr ferritic stainless steel of the bcc (body centered cubic) structure, which has a thermal expansion coefficient of about $10\times10^{-6}$ K$^{-1}$, as compared with about $7\times10^{-6}$ K$^{-1}$ for the conventional substrate material or $Al_2O_3$, so that the conventional materials of the heating resistors, oxidation protective layer, and abrasion protective layer can be used directly for the thermal head of the invention. Also, austenitic stainless steel of the fcc (face centered cubic) structure has a thermal expansion coefficient as high as about $17\times10^{-6}$ K$^{-1}$. The addition of aluminum, silicon, scandium, titanium, vanadium, yttrium, zirconium, niobium, lanthanum, and/or hafnium can stabilize the ferrite phase of the bcc structure, and prevents austenitization.

The Fe-Cr alloy can be fully improved in corrosion resistance only if it has a chromium content of about 5 to 30% by weight, preferably about 8 to 20%.

The content of additive element or elements, including aluminum, silicon, scandium, titanium, vanadium, yttrium, zirconium, niobium, lanthanum, and/or hafnium, is limited within a range from about 0.05% to 5% by weight, for the following reasons. If the content is less than 0.05% by weight, the aforementioned effects cannot be expected. If the content exceeds 5% by weight, on the other hand, the third element(s) may possibly change the crystal structure into an austenitic fcc structure. In such a case, moreover, the workability of thin sheet is lowered considerably, thus entailing poor economy.

The oxide layer can be used as a high electrical resistance layer by suitably selecting the amount of addition of the third element(s) and the thickness of the oxide layer.

Insulated substrates were prepared experimentally in which a polymide layer of 30-μm thickness is formed on an Fe-Cr alloy containing 16% chromium by weight. Thereupon, it was found that the substrate structure of the present invention can be manufactured at about one-fourth to one-eighth the cost of the prior art substrate structures. Moreover, thermal heads were assembled in the manner shown in FIG. 1, and were subjected to a normal test using $1\times10^8$ pulses, without presenting any problems in their characteristics:

What is claimed is:

1. A thermal head comprising:

(a) a substrate structure;

(b) a heating resistor formed on the substrate structure; and (c) an electric conductor formed on the substrate structure and connected electrically to the heating resistor;

(d) said substrate structure including an alloy, composed mainly of iron and chromium, and an electrical and heat insulating layer formed on the alloy, wherein said electrical and heat insulating layer is composed mainly of polyimide.

2. The thermal head according to claim 1, wherein said alloy contains approximately 5% to 30% chromium by weight.

3. A thermal head comprising:

(a) a substrate structure;

(b) a heating resistor formed on the substrate structure; and (c) an electric conductor formed on the substrate structure and connected electrically to the heating resistor, said substrate structure being an iron alloy containing approximately 5% to 30% chromium by weight and at least one element at a content of approximately 0.05% to 5% by weight, said element being selected from a group of elements including aluminum, silicon, scandium, titanium, vanadium, yttrium, zirconium, niobium, lanthanum, and hafnium, wherein said substrate structure includes an electrical and hat insulating layer formed on the alloy so that the heating resistor and the electric conductor are formed on the electrical and heat insulating layer, and wherein said electrical and heat insulating layer is composed mainly of glass.

4. The thermal head according to claim 3, wherein said substrate structure includes a metal substrate and a layer of an oxide of the constituent element of the metal, said oxide layer being formed on the main surface of the metal substrate.

5. The thermal head according to claim 4, wherein said oxide layer is an oxide of spinel.

6. The thermal head according to claim 3, wherein the thickness of said substrate structure ranges substantially from 0.03 mm to 1 mm.

7. The thermal head according to claim 3, wherein said glass layer is composed of crystallized glass.

* * * * *